United States Patent
Taniguchi et al.

(10) Patent No.: US 11,504,806 B2
(45) Date of Patent: Nov. 22, 2022

(54) THREE-DIMENSIONAL LASER MACHINE AND METHOD FOR CONTROLLING THE THREE-DIMENSIONAL LASER MACHINE

(71) Applicant: KOMATSU INDUSTRIES CORPORATION, Kanazawa (JP)

(72) Inventors: Ryuji Taniguchi, Komatsu (JP); Keita Yakabi, Tokyo (JP)

(73) Assignee: KOMATSU INDUSTRIES CORPORATION, Kanazawa (JP)

( * ) Notice: Subject to any disclaimer, the term of this patent is extended or adjusted under 35 U.S.C. 154(b) by 460 days.

(21) Appl. No.: 16/613,470

(22) PCT Filed: Apr. 6, 2018

(86) PCT No.: PCT/JP2018/014734
§ 371 (c)(1),
(2) Date: Nov. 14, 2019

(87) PCT Pub. No.: WO2019/003557
PCT Pub. Date: Jan. 3, 2019

(65) Prior Publication Data
US 2021/0086297 A1    Mar. 25, 2021

(30) Foreign Application Priority Data
Jun. 28, 2017  (JP) .............................. JP2017-126393

(51) Int. Cl.
*B23K 26/08*    (2014.01)
*G05B 19/404*   (2006.01)

(52) U.S. Cl.
CPC ........ *B23K 26/0892* (2013.01); *G05B 19/404* (2013.01); *G05B 2219/45165* (2013.01)

(58) Field of Classification Search
CPC .............. B23K 26/0892; B23K 26/048; B23K 26/0884; G05B 19/404;
(Continued)

(56) References Cited

U.S. PATENT DOCUMENTS

| | | | | |
|---|---|---|---|---|
| 6,914,209 B2* | 7/2005 | Yamaguchi | .......... | B23K 10/006 219/121.48 |
| 7,960,669 B2* | 6/2011 | Yamaguchi | ............. | B23P 23/00 219/121.48 |

(Continued)

FOREIGN PATENT DOCUMENTS

| | | |
|---|---|---|
| CN | 103111760 A | 5/2013 |
| CN | 106413971 A | 2/2017 |

(Continued)

OTHER PUBLICATIONS

English Translation of Written Reprot of PCT/JP2018/014734; dated Jul. 10, 2018; pp. 1-6.*

*Primary Examiner* — Ramesh B Patel
(74) *Attorney, Agent, or Firm* — Faegre Drinker Biddle & Reath LLP (57) ABSTRACT

A three-dimensional laser machine includes a machine head, a controller for positioning the machine head and controlling an orientation of a nozzle, and a sensor for detecting a distance between a workpiece and the nozzle. The controller is capable of performing a profile control of correcting the position of the machine head based on the detected distance. When the machine head has reached a predetermined position part way through an approach process of moving the machine head from an approach start position to a machining start position while controlling the pose of the nozzle, the controller performs the profile control to move the machine head to the machining start position.

8 Claims, 10 Drawing Sheets

(58) Field of Classification Search
CPC ........... G05B 2219/45165; G05B 2219/36199;
G05B 2219/49012; G05B 19/402
See application file for complete search history.

(56) References Cited

U.S. PATENT DOCUMENTS

| | | | | |
|---|---|---|---|---|
| 8,723,072 | B2* | 5/2014 | Yamaguchi | H05H 1/36 |
| | | | | 219/121.36 |
| 8,729,421 | B2* | 5/2014 | Ohnishi | B23K 37/0461 |
| | | | | 219/121.36 |
| 9,000,321 | B2* | 4/2015 | Yamaguchi | B23K 26/142 |
| | | | | 219/68 |
| 9,516,737 | B2* | 12/2016 | Yamaguchi | B23K 10/006 |
| 9,815,140 | B2* | 11/2017 | Hayashi | B23K 26/0608 |
| 10,189,110 | B2* | 1/2019 | Yamaguchi | B23K 10/006 |
| 10,232,460 | B2* | 3/2019 | Yamaguchi | H05H 1/34 |
| 10,380,732 | B2* | 8/2019 | Watanabe | G06V 10/50 |
| 10,576,526 | B2* | 3/2020 | Asada | B21D 43/003 |
| 2003/0183608 | A1* | 10/2003 | Yamazaki | B23K 26/0853 |
| | | | | 219/121.84 |

FOREIGN PATENT DOCUMENTS

| | | | |
|---|---|---|---|
| JP | H10-175085 | A | 6/1998 |
| JP | 2000-317665 | A | 11/2000 |
| JP | 2000-343255 | A | 12/2000 |
| JP | 2004-1067 | A | 1/2004 |
| JP | 2008-110389 | A | 5/2008 |
| JP | 4828374 | B2 | 11/2011 |

* cited by examiner

THREE-DIMENSIONAL LASER MACHINE AND METHOD FOR CONTROLLING THE THREE-DIMENSIONAL LASER MACHINE

TECHNICAL FIELD

The present disclosure relates to a three-dimensional laser machine and a method for controlling the three-dimensional laser machine.

BACKGROUND ART

Conventionally, laser machines are known which emit laser to a workpiece. In such laser machines, the machine head is moved from a machining end position to the next approach start position according to a move process referred to as air cut. As the machine head reaches the approach start position, an approach process is performed according to which the machine head is moved to the next machining start position.

As such a laser machine, PTL 1 discloses a three-dimensional laser machine capable of three-dimensional machining of a workpiece. The three-dimensional laser machine disclosed in PTL 1 positions the machine head based on three axes, which are X-axis, Y-axis, and Z-axis, and controls the pose of the machine head based on two, i.e., C-axis and A-axis of rotation. While the laser machine is performing laser machining (while emitting a laser beam), the laser machine performs a profile control of correcting the position of the machine head so that the distance (gap amount) between the machine head and a machined surface of the workpiece is a predetermined set value (target value).

Moreover, for example, PTLs 2 and 3 disclose two-dimensional laser machines capable of emitting a laser beam only in the negative direction of Z-axis. The laser machine disclosed in PTL 2 performs a profile control when the machine head starts moving diagonally downward as the machine head is moved from the stowed position to the next machining start position. The laser machine disclosed in PTL 3 performs a profile control when the machine head moves down below a midpoint and the gap amount has reached a given amount as the machine head is moved from the stowed position the next machining start position.

CITATION LIST

Patent Literature

PTL 1: Japanese Patent Laying-Open No. 1110-175085
PTL 2: Japanese Patent Laying-Open No. 2008-110389
PTL 3: Japanese Patent Laying-Open No. 2004-1067

SUMMARY OF INVENTION

Technical Problem

The three-dimensional laser machine disclosed in PTL 1 is configured to emit the laser beam in three-dimensional directions through the nozzle of the machine head. Thus, the nozzle is not always oriented in Z-axis direction during the approach process. Moreover, such a three-dimensional laser machine may change the direction of the nozzle during the approach process. For this reason, the configuration of correcting the position of the machine head only in Z-axis direction by the profile control, as disclosed in PTLs 2 and 3, is not applicable, as is, to three-dimensional laser machines.

An object of the present disclosure is to provide a three-dimensional laser machine capable of performing an approach process promptly, and a method for controlling the three-dimensional laser machine.

Solution to Problem

According to a certain aspect of the present disclosure, a three-dimensional laser machine includes: a machine head having a nozzle, for emitting a laser beam to a workpiece through the nozzle; a controller for positioning the machine head and controlling an orientation of the nozzle; and a sensor for detecting a distance between the workpiece and the nozzle. The controller is capable of performing a profile control of correcting a position of the machine head based on the detected distance. When the machine head reaches a predetermined first position part way through an approach process of moving the machine head from an approach start position to a machining start position while controlling the orientation of the nozzle, the controller performs the profile control and moves the machine head to the machining start position.

Advantageous Effects of Invention

According to the present disclosure, the approach process can be performed promptly.

DESCRIPTION OF EMBODIMENTS

Hereinafter, embodiments will be described, with reference to the accompanying drawings. Configurations described in the embodiments are originally intended to be combined as appropriate. Some of the components may not be used. In the following, the description will be given, with reference to a three-dimensional Cartesian coordinate system (XYZ coordinate system).

<A. Apparatus Configuration>

Figure 1:
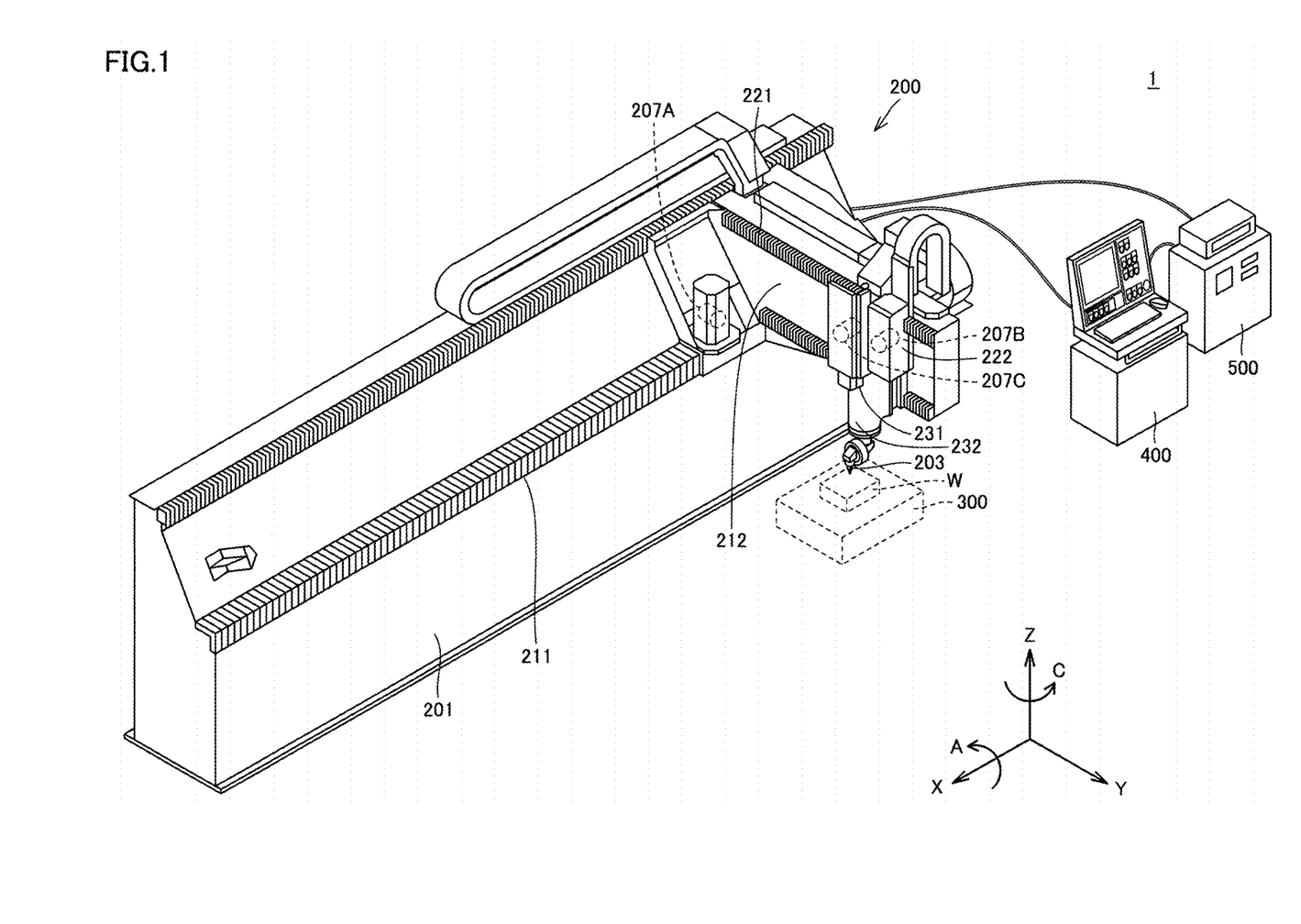
FIG. 1 is a perspective view of a laser machine.

FIG. 1 is a perspective view of a laser machine 1. Laser machine 1 is a three-dimensional laser machine which supports five-axis (X-axis, Y-axis, Z-axis, C-axis, A-axis) control. Laser machine 1 is, by way of example, a fiber laser machine. According to laser machine 1, a workpiece can be machined into a desired shape by cutting it.

As shown in FIG. 1, laser machine 1 includes a machine main body 200, a table 300, a controller 400, and an oscillator 500. Machine main body 200 is installed in a machine room not shown. Controller 400 and oscillator 500 are installed outside the machine room.

Controller 400 is communicably connected to machine main body 200, a drive (not shown) for driving the table 300, and oscillator 500. Controller 400 controls operation of machine main body 200, operation of table 300, and operation of oscillator 500.

Oscillator 500 oscillates a laser beam, based on a command from controller 400. The oscillated laser beam is sent to machine main body 200 via an optic fiber.

A workpiece W (a machining object, a machined member) is placed on table 300. Table 300 moves in and out of the machine room, based on a command from controller 400.

Machine main body 200 includes a base member 201, a machine head 203, servomotors 207A, 207B, 207C, guide members 211, 221, 231, and movable members 212, 222, 232.

Servomotors 207A, 207B, 207C are driven based on commands from controller 400.

Guide member 211 is provided on base member 201. Movable member 212 is movably supported by guide member 211. Movable member 212 is moved by servomotor 207A. The movement of movable member 212 moves machine head 203 in the positive direction and negative direction of X-axis.

Guide member 221 is provided on movable member 212. Movable member 222 is movably supported by guide member 221. Movable member 222 is moved by servomotor 207B. The movement of movable member 222 moves machine head 203 in the positive direction and negative direction of Y-axis.

Guide member 231 is provided on movable member 222. Movable member 232 is movably supported by guide member 231. Movable member 232 is moved by servomotor 207C. The movement of movable member 232 moves machine head 203 in the positive direction and negative direction of Z-axis.

According to such a configuration, controller 400 moves machine head 203 in X-axis direction, Y-axis direction, and Z-axis direction, thereby positioning machine head 203.

Figure 2:
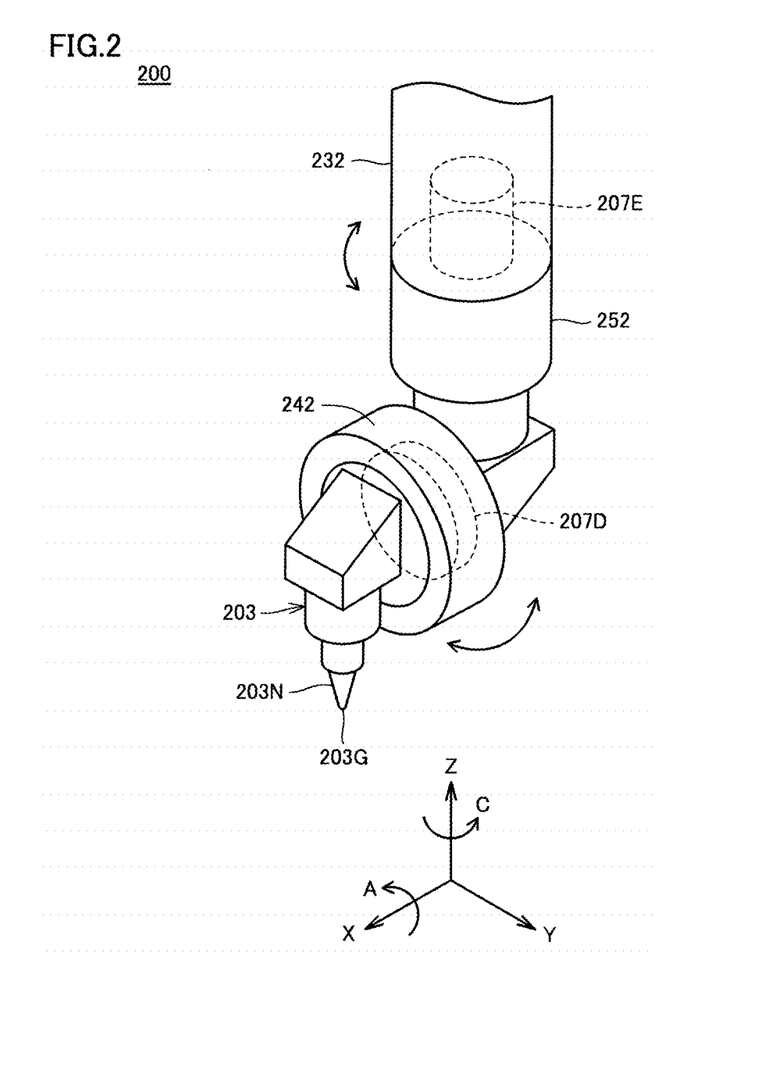
FIG. 2 is an enlarged view showing a machine head of FIG. 1 and the periphery thereof.

FIG. 2 is an enlarged view showing machine head 203 of FIG. 1 and the periphery thereof.

As shown in FIG. 2, machine main body 200 further includes servomotors 207D, 207E and movable members 242, 252, in addition to machine head 203 and movable member 232. Machine head 203 includes a nozzle 203N and a gap sensor 203G.

Nozzle 203N is located on the tip of machine head 203. Nozzle 203N causes the laser beam, sent from oscillator 500, to be emitted to workpiece W.

Gap sensor 203G detects a distance between workpiece W and nozzle 203N. Gap sensor 203G sends a result of the detection to controller 400. By way of example, a capacitive sensor may be used as gap sensor 203G.

Servomotors 207D, 207E are driven based on commands from controller 400.

Movable member 252 is rotatably supported by movable member 232. Movable member 252 is rotated by servomotor 207D about C-axis. C-axis is in parallel with Z-axis. The rotation of movable member 252 causes machine head 203 to rotate about C-axis.

Movable member 242 is rotatably supported by movable member 252. Movable member 242 is rotated by servomotor 207E about A-axis. A-axis is perpendicular to C-axis and the direction of A-axis varies according to the rotation of C-axis. The rotation of movable member 242 causes machine head 203 to rotate about A-axis.

According to such a configuration, controller 400 rotates machine head 203 about C-axis and A-axis, thereby controlling the pose of machine head 203. This controls the orientation (pose) of nozzle 203N.

Figure 3:
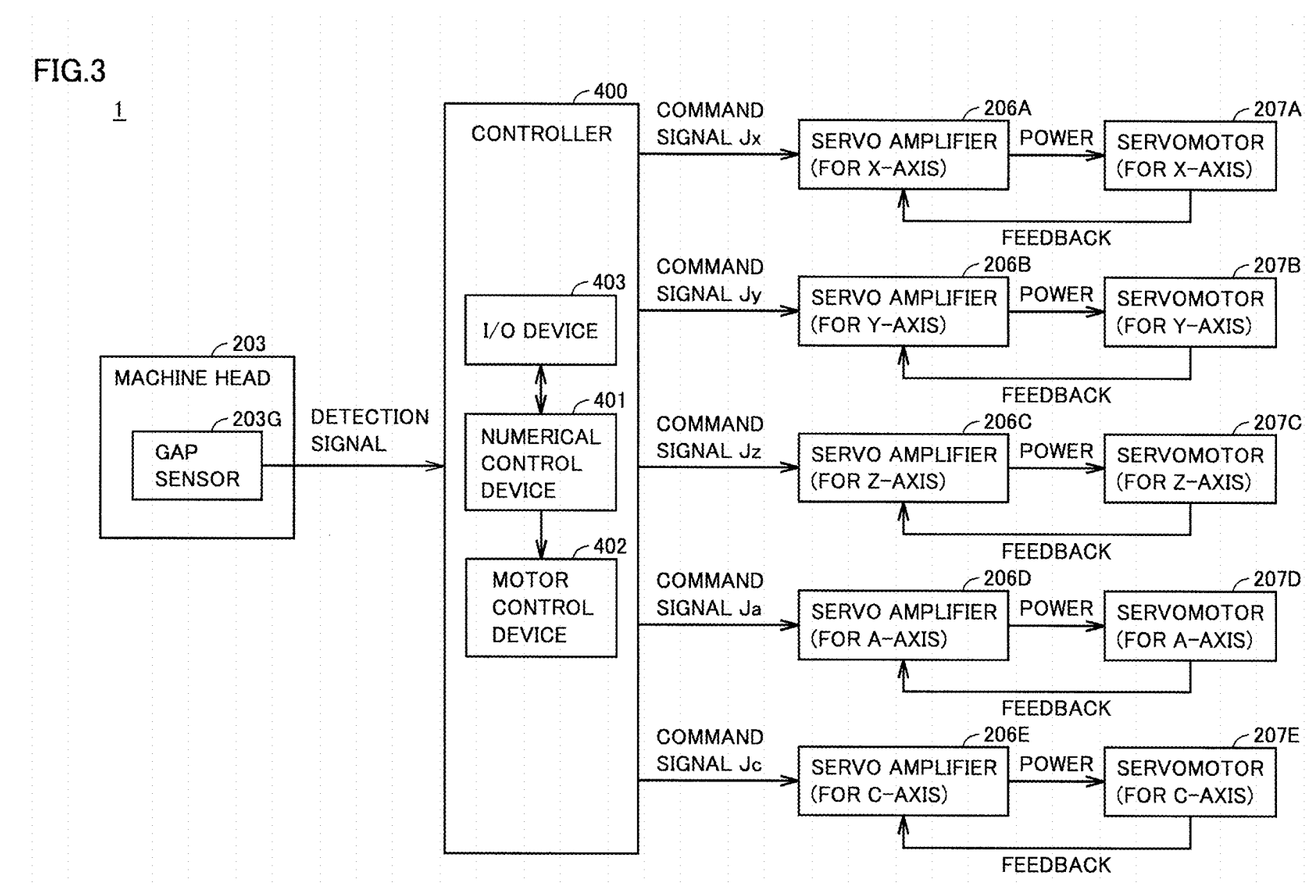
FIG. 3 is a block diagram representing a portion of a hardware configuration of the laser machine.

FIG. 3 is a block diagram representing a portion of a hardware configuration of laser machine 1.

As shown in FIG. 3, laser machine 1 further includes servo amplifiers 206A, 206B, 206C, 206D, 206E, in addition to controller 400, machine head 203, and servomotors 207A to 207E.

Controller 400 includes a numerical control device (NC device) 401, a motor control device 402, and an I/O device 403.

Controller 400 is capable of performing a profile control of correcting the position of machine head 203 so that a distance detected by gap sensor 203G is a predetermined set value. Timing the controller 400 performs the profile control feature will be described below.

I/O device 403 is communicably connected to numerical control device 401. I/O device 403 functions as a man machine interface. I/O device 403 has an input device, such as a keyboard, touch panel, mouse, etc. I/O device 403 further has an output device, such as a display, printer, etc.

Numerical control device 401 executes a sequence program, such as a pre-stored ladder program, and a machining program (NC program) which is created by a user. The machining program is written in G-code, for example. Executions of these programs move machine head 203, control the orientation of nozzle 203N, control whether to emit the laser beam, etc. A result of detection by gap sensor 203G is input to numerical control device 401. In the following, the sequence program and the machining program are also referred to as a "control program."

Numerical control device 401 sends, to the motor control device, a result of execution of the control program that is related to the motor control. While controller 400 is performing the profile control, controller 400 refers to a value of the detection signal sent from gap sensor 203G and executes the control program.

Motor control device 402 sends a command signal Jx to servo amplifier 206A to drive servomotor 207A. Servo amplifier 206A supplies servomotor 207A with power that is based on command signal Jx. This drives servomotor 207A and the X-coordinate position of machine head 203 is in a position as commanded by controller 400.

Similarly, motor control device 402 sends command signals Jy, Jz, Ja, Jc to servo amplifiers 206B, 206C, 206D, 206E to drive servomotors 207B, 207C, 207D, 207E, respectively. Servo amplifiers 206B, 206C, 206D, 206E supply servomotors 207B, 207C, 207D, 207E with powers that are based on command signals Jy, Jz, Ja, Jc, respectively.

Due to this, the Y-coordinate position and the Z-coordinate position of machine head 203 are in position, as commanded by controller 400. Furthermore, the orientation of the nozzle is in an orientation as commanded by controller 400.

<B. Outline of Profile Control>

Figure 4:
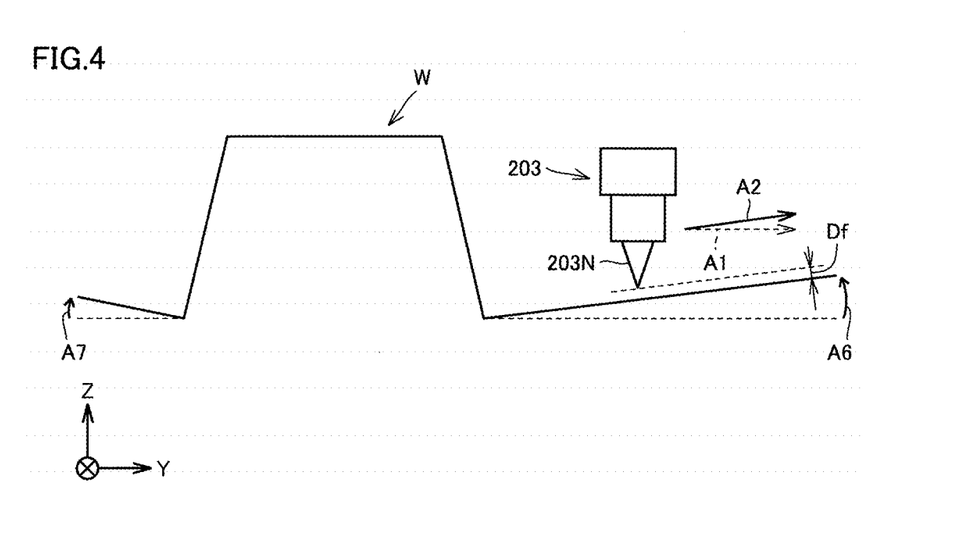
FIG. 4 is a diagram for illustrating a profile control during laser machining.

FIG. 4 is a diagram for illustrating the profile control during the laser machining.

As shown in FIG. 4, assume that workpiece W has springback in the directions indicated by arrows A6, A7 when the laser beam is to be emitted through nozzle 203N while machine head 203 is moving in the direction indicated by arrow A1. In such a case, nozzle 203N comes into contact with workpiece W if machine head 203 is moved in the direction indicated by arrow A1.

However, the position of nozzle 203N is controllable by performing the profile control, so that the distance (hereinafter, also referred to as a "gap amount Dg") between nozzle 203N and a machined surface (machined area) of workpiece W is a reference gap amount Df. In the case of FIG. 4, controller 400 corrects the position of nozzle 203N in Z direction so that gap amount Dg is reference gap amount Df. This corrects the route of machine head 203 from the route indicated by arrow A1 to the route indicated by arrow A2.

More specifically, controller 400 corrects the position of machine head 203 so that gap amount Dg meets the following Equation (1). Note that δ is an allowable error.

$$Df-\delta \leq Dg \leq Df+\delta \qquad (1)$$

<C. Air Cut Process>

Prior to describing the approach process, an air cut process of moving machine head 203 from a machining end position (end-of-cut position) to an approach start position will be described. Note that the profile control is not performed during the air cut process.

Figure 5:
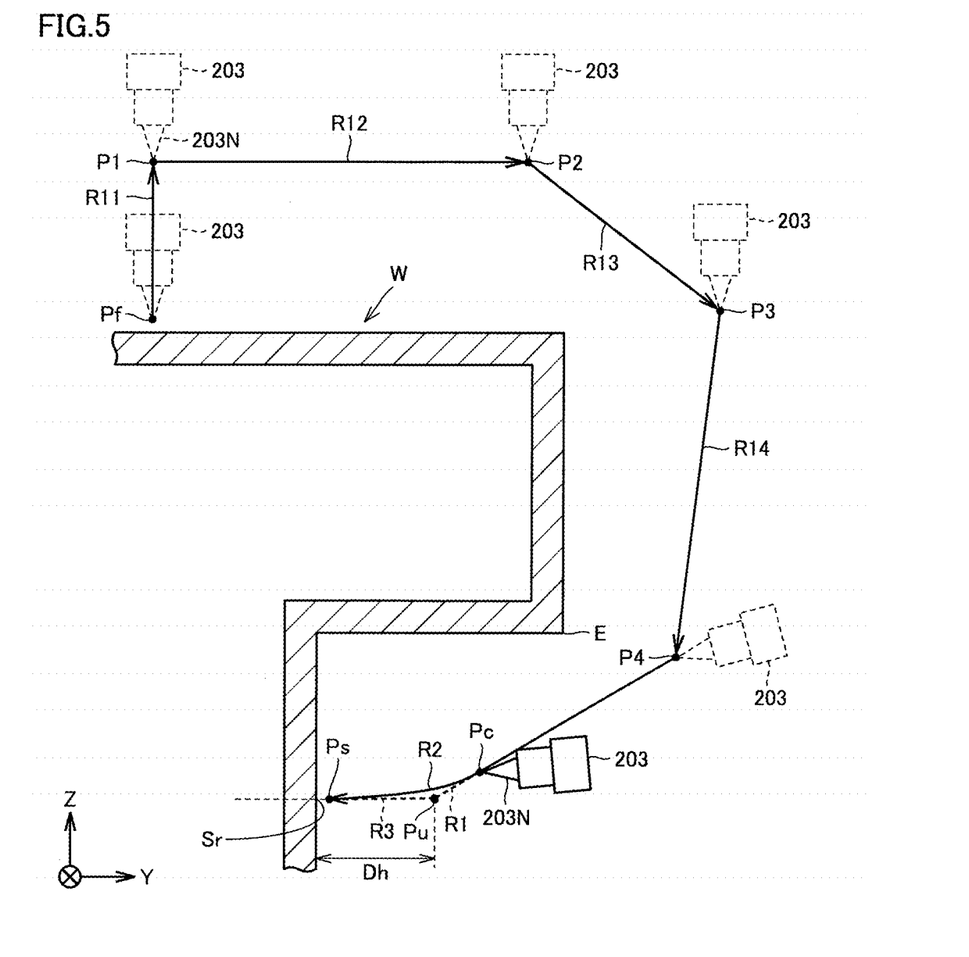
FIG. 5 is a diagram representing a route along which a machine head moves from a machining end position to a machining start position.

FIG. 5 is a diagram representing a route along which machine head 203 moves from a machining end position Pf to a machining start position Ps. Referring to FIG. 5, the movement of machine head 203 from machining end position Pf to approach start position P4 corresponds to the air cut process.

Controller 400 executes the program stored in controller 400, thereby moving machine head 203 and controlling the orientation of nozzle 203N.

Specifically, controller 400 pre-stores multiple teaching positions designated by a teaching process. Controller 400 moves machine head 203 to approach start position P4 via multiple teaching positions. In this example, a stowed position P1, a position P2, a position P3, and an approach start position P4 are teaching positions. Orientations of nozzle 203N at positions P1, P2, P3, P4 have also been taught previously, and thus the orientations of nozzle 203N are controlled so as to be oriented as taught at positions P1, P2, P3, P4.

As shown in FIG. 5, machine head 203 moves along a route R11 from the previous machining end position Pf, and reaches stowed position P1. Machine head 203 then moves along a route R12, a route R13, and a route R14 via positions P2, P3, and reaches approach start position P4. The approach process continues to be performed.

Note that approach start position P4 is a teaching position that machine head 203 last passes through among the multiple teaching positions. The teaching positions are stored in association of sequence information representing the sequence they are passed through by machine head 203.

Route R12 connects stowed position P1 and position P2 in a straight line. Route R13 connects position P2 and position P3 in a straight line. Route R14 connects position P3 and approach start position P4 in a straight line. A control program for linearly moving machine head 203 between successive teaching positions is pre-incorporated into controller 400.

<D. Profile Control During Approach Process>

An approach process of moving machine head 203 from approach start position P4 to machining start position Ps (start-of-cut position) will be described. Laser machine 1 performs the profile control not only during the laser machining, but also during the approach process. Laser machine 1 starts the profile control part way through the approach process, as will be described in detail below.

The position of machine head 203 and the orientation of nozzle 203N at machining start position Ps are further defined in the control program described above. Particularly, the orientation of nozzle 203N is pre-programmed so that the laser beam is emitted, at machining start position Ps, to a machined area Sr of workpiece W in the normal direction of machined area Sr.

Speeds at which the orientation of nozzle 203N is varied (angular velocities about A-axis and C-axis), etc. are also defined in the control program. In this example, by way of example, the control program is created so that the orientation of nozzle 203N varies evenly from approach start position P4 to machining start position Ps.

(d1. Execution of Profile Control)

As machine head 203 reaches a predetermined position Pc (hereinafter, referred to as a "set position Pc") by the approach process, controller 400 performs the profile control to move machine head 203 to machining start position Ps.

Specifically, as machine head 203 reaches approach start position P4, controller 400 executes the control program for linearly moving machine head 203 from approach start position P4 to position Pu along a route that is connecting approach start position P4 and a predetermined position Pu in a straight line. Controller 400 performs the profile control during the execution of the control program, thereby correcting the route of movement of machine head 203 from route R1 to route R2. Route R1 connects set position Pc and position Pu in a straight line. Route R2 connects set position Pc and machining start position Ps.

The above position Pu is set spaced apart, by a predetermined distance Dh in the normal direction of machined area Sr, from machined area Sr of workpiece W to which the laser beam is emitted when machine head 203 is at machining start position Ps. Set position Pc is set spaced apart from position Pu by a predetermined distance.

Note that machine head 203 passes along route R1 if controller 400 does not turn on the profile control feature when machine head 203 is at set position Pc. If the profile control is not performed, machine head 203 moves along route R1, and then moves along route R3 connecting position Pu and machining start position Ps in a straight line, to reach machining start position Ps.

(d2. Correction to Align with Normal Direction)

Controller 400 pre-stores data (hereafter, also referred to as "pose data") as the orientation of nozzle 203N at machining start position Ps, the data allowing the direction of emission of the laser beam to align with the normal direction of machined area Sr. While machine head 203 is moving from set position Pc to machining start position Ps along route R2, controller 400 corrects the position of machine head 203 based on the pose data so that the position of machine head 203 aligns with the normal direction (Y-axis direction in the example of FIG. 5) of machined area Sr.

Specifically, while machine head 203 is moving from set position Pc to machining start position Ps along route R2, controller 400 resolves the direction of movement of machine head 203 into X-axis direction, Y-axis direction, and Z-axis direction so that the position of machine head 203 is corrected, by the profile control, to align with the normal direction of machined area Sr.

More specifically, controller 400 calculates the orientation of nozzle 203N at machining start position Ps from the information about the orientation of C-axis and orientation of A-axis (information about the orientation of nozzle 203N) which are set when machine head 203 is at machining start position Ps. Note that the orientation of nozzle 203N is from the bottom end to the top of nozzle 203N, which is also the orientation of the optical axis of the laser beam emitted through nozzle 203N. Note that the orientation of nozzle 203N is aligned with the negative direction of Y-axis in the case of FIG. 5. Controller 400 drives servomotors 207A, 207B, 207C so that the position of machine head 203 is corrected to align with the normal direction of machined area Sr by the profile control.

(d3. Details of Correction of Route of Movement)

As noted above, controller 400 starts the profile control when machine head 203 reaches set position Pc during the execution of the control program. This allows controller 400 to correct the route of movement of machine head 203 from route R1 to route R2. In the following, details of the correction will be described.

During the profile control, controller 400 periodically corrects the direction of movement of machine head 203, based on a predetermined control cycle.

Figure 6:
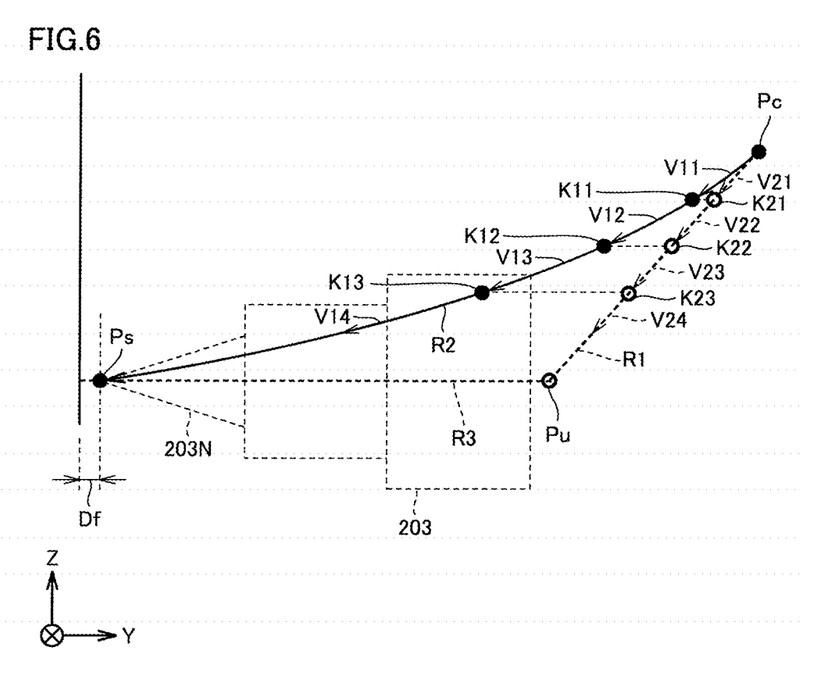
FIG. 6 is an enlarged view showing a portion of the route of movement shown in FIG. 5.

FIG. 6 is an enlarged view showing a portion of the route illustrated in FIG. 5. As shown in FIG. 6, positions K21, K22, K23, represented by white circles, and arrows V21, V22, V23, V24 represent the positions of machine head 203 and directions of movement of machine head 203 in Comparative Example with respect to the control example of the present embodiment, the Comparative Example assuming that the profile control is not performed.

Positions K21, K22, K23 are each a position of machine head 203 (position of the tip of nozzle 203N) for each control cycle when the profile control is not performed. In this case, machine head 203 advances from set position Pc in the direction indicated by arrow V21, and reaches position K21. Machine head 203 moves from position K21 in the direction indicated by arrow V22, and reaches position K22. Machine head 203 thereafter moves from position K22 in the direction indicated by arrow V23, and reaches position K23, and then moves in the direction indicated by arrow V24.

Note that the speed of movement of machine head 203 on route R1 is constant in this example, and thus the spacing between set position Pc and position K21, the spacing between position K21 and position K22, and the spacing between position K22 and position K23 are the same. Since route R1 is a straight line, the direction of movement of machine head 203 is the same at every control cycle.

In contrast, positions K11, K12, K13 are each a position of machine head 203 for each control cycle when the profile control is started at set position Pc. As controller 400 starts the profile control when machine head 203 is at set position Pc, controller 400 starts correcting the position of nozzle 203N based on gap amount Dg, which is a result of the detection by gap sensor 203G, so that the distance between nozzle 203N and machined area Sr of the workpiece is reference gap amount Df which is a target value. In this case, controller 400 corrects the position of machine head 203 by the profile control so that the position of machine head 203 aligns with the normal direction of machined area Sr, as noted above.

In the example of FIG. 6, when machine head 203 is at set position Pc, controller 400 corrects the position of machine head 203 to align the position of machine head 203 with the normal direction of machined area Sr, as described above, thereby correcting the direction of movement of machine head 203 from one indicated by arrow V21 to one indicated by arrow V11. This corrects the position of machine head 203 from position K21 to position K11. Similarly, when machine head 203 is at position K11, controller 400 then corrects the direction of movement of machine head 203 from one indicated by arrow V22 to one indicated by arrow V12, thereby correcting the position of machine head 203 from position K22 to position K12. Further similarly, when machine head 203 is at position K12, controller 400 corrects the direction of movement of machine head 203 from arrow V23 to arrow V13, thereby correcting the position of machine head 203 from position K23 to position K13, and then moves machine head 203 in the direction indicated by arrow V14.

Since the position of machine head 203 is corrected by the profile control to align the position of machine head 203 with the normal direction of machined area Sr, it should be noted that the speed of movement of machine head 203 from set position Pc to position K11, the speed of movement of machine head 203 from position K11 to position K12, and the speed of movement of machine head 203 from position K12 to position K13 are different. In this example, the speed of movement of machine head 203 increases with each consecutive control cycle. The spacing between set position Pc and position K11, position K11 and position K12, and position K12 and position K13 also increases with each consecutive control cycle.

More specifically, controller 400 calculates, for each control cycle, a gap amount (hereinafter, referred to as a "gap correction amount Q") according to which the position of machine head 203 is corrected at each control cycle, and resolves the calculated gap correction amount Q into a component Qx in X-axis direction, a component Qy in Y-axis direction, and a component Qz in Z-axis direction. Note that gap correction amount Q is a scalar quantity.

Controller 400 uses the value of component Qx to correct command signal Jx to be output to servo amplifier 206A (see FIG. 3). Similarly, controller 400 uses the value of component Qy to correct command signal Jy to be output to servo amplifiers 206B, and uses the value of component Qz to correct command signal Jz to be output to servo amplifiers 206C.

Figure 7:
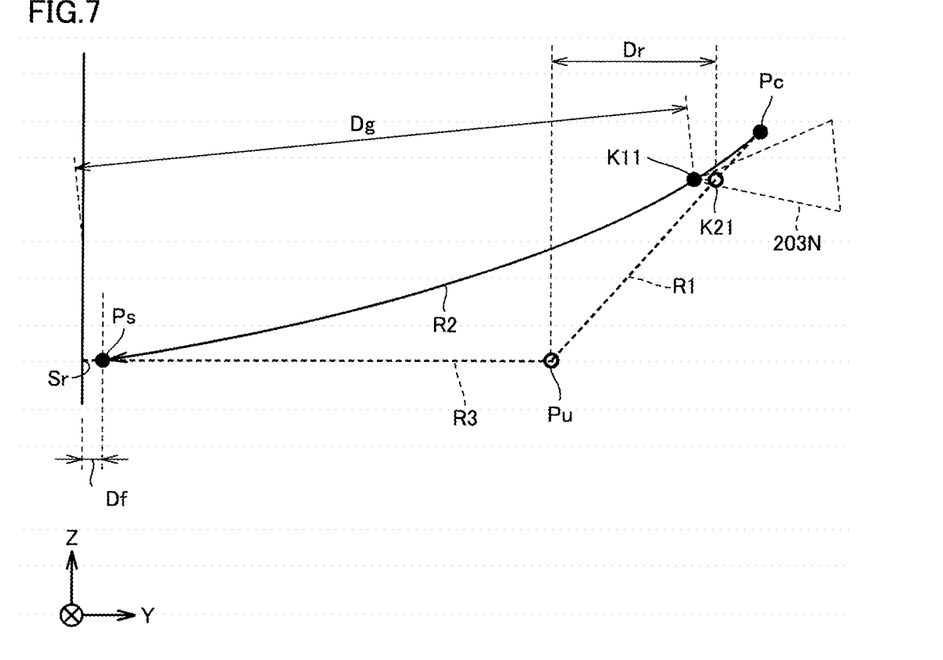
FIG. 7 is a diagram for illustrating a method of calculation of a gap correction amount.

FIG. 7 is a diagram for illustrating a method of the calculation of gap correction amount Q.

For purpose of explanation, the method of calculation will be described, focusing on when nozzle 203N has reached position K11 by the profile correction, as shown in FIG. 7. Note that the same calculation is made when nozzle 203N reaches set position Pc and positions K12, K13, K14, and so on.

Controller 400 acquires gap amount Dg based on an output from gap sensor 203G. Controller 400 calculates the distance between position K21, to which position K11 is to be corrected, and position Pu. Further, controller 400 calculates distance Dr, which is a component, of the calculate distance, in the normal direction of machined area Sr. In this manner, controller 400 calculates distance Dr which is a component, of a distance, in the normal direction of machined area Sr, the distance being between a position on route R1 before the profile correction and position Pu.

Controller 400 calculates distance Ds by subtracting distance Dr from gap amount Dg. Controller 400 calculates gap correction amount Q based on distance Ds.

Note that the calculation of gap correction amount based on a distance is the same as the calculation of a gap correction amount which is made during machining by a conventional three-dimensional laser machine, except for the use of distance Ds as the above.

Machine head 203 is moved to machining start position Ps along route R2, according to the correction process as the above.

(d4. Advantages Effects)

Advantages effects of laser machine 1 will be described based on FIG. 5.

(1) As described above, when machine head 203 reaches set position Pc part way through the approach process of moving machine head 203 from an approach start position to a machining start position while controlling the orientation of nozzle 203N, controller 400 performs the profile control and moves machine head 203 to machining start position Ps. According to such a configuration, the approach process can be performed promptly, as described below.

In a configuration where the profile control is started when machine head 203 has reached position Pu, machine head 203 passes along route R1 and route R3 to reach machining start position Ps, as noted above. In this configuration, controller 400 needs to slow down machine head 203 before position Pu and temporarily stop machine head 203 at position Pu. Controller 400 then needs to increase the speed of movement of machine head 203 along route R3.

In contrast, as in the present example, if the profile control is started when machine head 203 has reached set position Pc, machine head 203 can reach machining start position Ps along route R2, as noted above. In this case, there is no need to temporarily stop machine head 203 at position Pu, unlike the configuration in which the profile control is started when machine head 203 has reached position Pu.

Consequently, according to laser machine 1, time required to move nozzle 203N from set position Pc to machining start position Ps can be reduced, as compared to the configuration in which the profile control is started when machine head 203 is at position Pu. For this reason, according to laser machine 1, the approach process can be performed promptly.

The following advantages effects are also provided. In the configuration in which the profile control is started when nozzle 203N is at approach start position P4, depending on a way of determination of approach start position P4 (determination of teaching positions), nozzle 203N may end up coming into contact with a surface of workpiece W while nozzle 203N is much away from machined area Sr. For example, in FIG. 5, if approach start position P4 is set offset in the positive direction of Z-axis from the position shown in figure, nozzle 203N may end up coming into contact with a surface of workpiece W that is offset in the positive direction of Z-axis from an edge portion E of workpiece W. In this case, nozzle 203N moves along the surface of workpiece W until it reaches machining start position Ps. Laser machine 1 can prevent nozzle 203N from moving along such a route.

(2) Approach start position P4 is a position (teaching position) designated by the teaching process. According to such a configuration, there is no need for controller 400 to calculate the approach start position by route calculation (e.g., calculation of the shortest distance to the approach start position).

Particularly, in this example, since stowed position P1 and positions P2, P3 are also determined by the teaching process, controller 400 can readily determine a route from a machining end position Pf to approach start position P4.

(3) When machine head 203 has reached approach start position P4 according to the air cut process, controller 400 executes the control program for moving machine head 203 from approach start position P4 to position Pu along a route connecting approach start position P4 and a predetermined position Pu in a straight line. Set position Pc is on this route.

According to such a configuration, machine head 203 is allowed to move to machining start position Ps while being brought closer to the surface of workpiece W.

(4) Position Pu is away, by a predetermined distance Dh in the normal direction of machined area Sr, from machined area Sr of workpiece W to which the laser beam is emitted when machine head 203 is at machining start position Ps. According to such a configuration, position Pu is away from machining start position Ps along the normal direction of machined area Sr, thereby allowing machine head 203 to move to machining start position Ps.

(5) While machine head 203 is moving from set position Pc to machining start position Ps, controller 400 corrects the position of machine head 203 by the profile control so that the position of machine head 203 aligns with the normal direction of machined area Sr.

Specifically, controller 400 calculates, for each control cycle, a correction amount (gap correction amount Q), which is used to correct the position of machine head 203 by the profile control. Controller 400 resolves the gap correction amount Q into component Qx in X-axis direction, component Qy in Y-axis direction, and component Qz in Z-axis direction for each control cycle so that the position of machine head 203 is corrected to align with the normal direction of machined area Sr.

According to such a configuration, machine head 203 is allowed to move, with accuracy, to machining start position Ps which is a target position.

(6) Controller 400 pre-stores the pose data as the orientation of nozzle 203N at machining start position Ps, the pose data allowing the direction of emission of the laser beam to align with the normal direction of machined area Sr. Based on the pose data, controller 400 corrects the position of machine head 203 by the profile control so that the position of machine head 203 aligns with the normal direction of machined area Sr.

According to such a configuration, since the orientation of nozzle 203N is made aligned with the normal direction of machined area Sr, machine head 203 is allowed to move, with accuracy, to machining start position Ps which is a target position.

<E. Flow of Data Processing>

Figure 8:
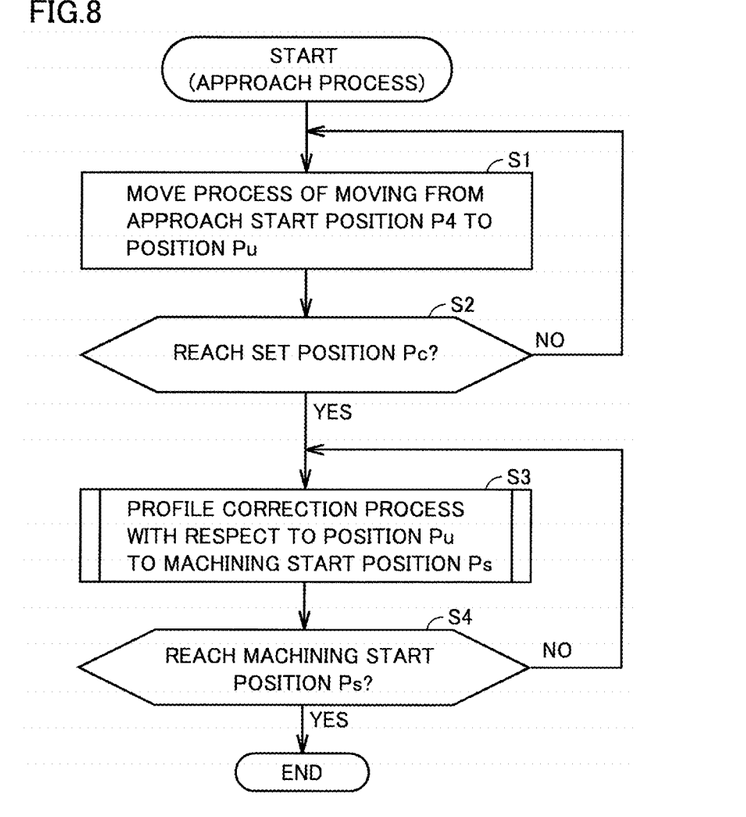
FIG. 8 is a flow diagram for illustrating a flow of processing performed by a controller in the case of FIG. 5.

FIG. 8 is a flow diagram for illustrating a flow of processing performed by controller 400 in the case of FIG. 5.

As illustrated in FIG. 8, at step S1, as machine head 203 reaches approach start position P4, controller 400 performs a move process of moving machine head 203 from approach start position P4 to position Pu along a route connecting approach start position P4 and position Pu in a straight line. At step S2, controller 400 determines whether machine head 203 has reached set position Pc.

If controller 400 determines that machine head 203 has reached set position Pc (YES at step S2), controller 400, at step S3, performs the profile correction process with respect to position Pu to machining start position Ps. Specifically, controller 400 performs the correction process with respect to the distance in route R3 that is aligned with the normal direction of machined area Sr. Controller 400 moves machine head 203 from set position Pc to machining start position Ps, according to the correct process. This corrects the route of movement of machine head 203 after set position Pc, from route R1 and route R3 to route R2. If controller 400 determines that machine head 203 has not reached set position Pc yet (NO at step S2), the process returns to step S2.

At step S4, controller 400 determines whether machine head 203 has reached machining start position Ps. If controller 400 determines that machine head 203 has reached machining start position Ps (YES at step S4), the approach process ends. If controller 400 determines that machine head 203 has not reached machining start position Ps yet (NO at step S2), the process returns to step S3.

Figure 9:
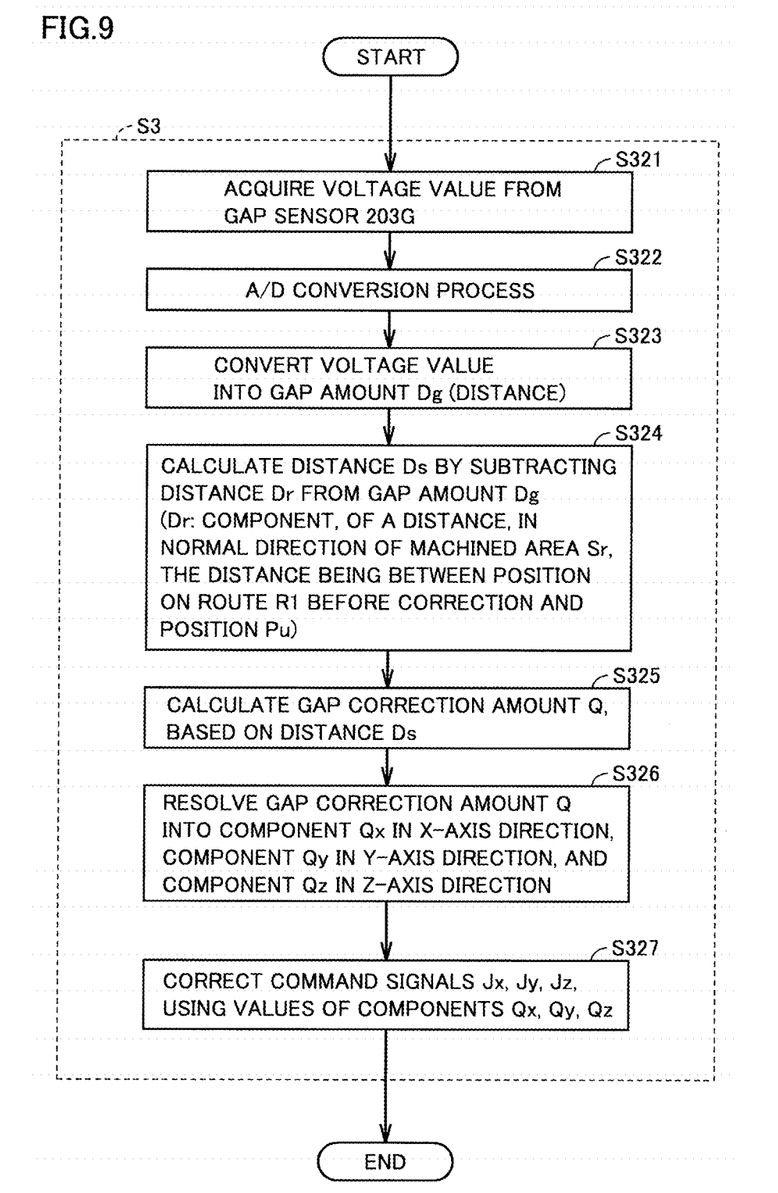
FIG. 9 is a flow diagram representing details of process step S3 of FIG. 8.

FIG. 9 is a flow diagram representing details of the process step S3 of FIG. 8. As illustrated in FIG. 9, the process step S3 includes steps S321 to S327. These process steps and the process step S4 that is illustrated in FIG. 8 are performed for each control cycle.

At step S321, controller 400 acquires a voltage value (analog value) from gap sensor 203G. At step S322, controller 400 converts the voltage value into a digital value according to analog to digital (A/D) conversion.

At step S323, controller 400 converts the voltage value (digital value) into gap amount Dg, using a transformation or a translation table pre-stored in controller 400. At step S324, controller 400 calculates distance Ds by subtracting distance Dr from gap amount Dg. Note that distance Dr is a component, in the normal direction of machined area Sr, of the distance between a position on route R1 before the correction and position Pu, as noted above.

At step S325, controller 400 calculates gap correction amount Q (an amount of gap corrected at the current control cycle), based on distance Ds.

At step S326, controller 400 resolves gap correction amount Q into component Qx in X-axis direction, component Qy in Y-axis direction, and component Qz in Z-axis direction so that the position of machine head 203 is corrected by the profile control to align with the normal direction of machined area Sr. At step S327, controller 400 corrects command signal Jx, using the value of component Qx, corrects command signal Jy, using the value of component Qy, and corrects command signal 3z, using the value of component Qz.

Note that after step S326, controller 400 passes the process to step S4 of FIG. 8.

<F. Functional Configuration>

Figure 10:
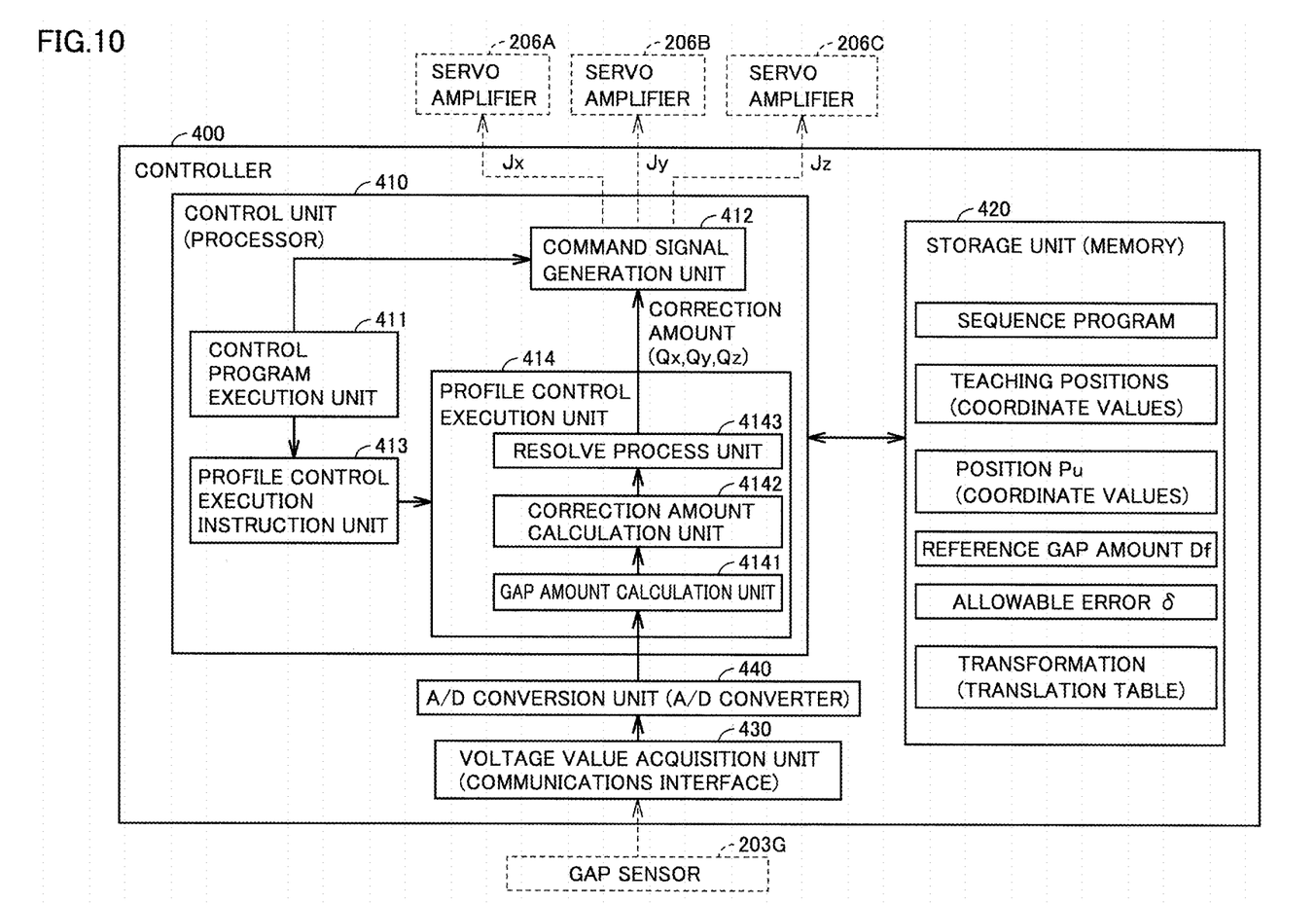
FIG. 10 is a functional block diagram for illustrating a functional configuration of the controller during an approach process.

FIG. 10 is a functional block diagram for illustrating a functional configuration of controller 400 during the approach process.

Referring to FIG. 10, controller 400 includes a control unit 410, a storage unit 420, a voltage value acquisition unit 430, and an analog-to-digital (A/D) conversion unit 440.

Control unit 410 is implemented by a processor executing various programs, including the control program. Storage unit 420 includes a nonvolatile memory, such as a flash memory or a hard disk.

Control unit 410 includes a control program execution unit 411, a command signal generation unit 412, a profile control execution instruction unit 413, and a profile control execution unit 414. Profile control execution unit 414 includes a gap amount calculation unit 4141, a correction amount calculation unit 4142, and a resolve process unit 4143.

Storage unit 420 stores various programs such as an operating system, the sequence program, and the machining program, and information such as coordinate values of the teaching positions, coordinate values of position Pu, reference gap amount Df, allowable error δ, the transformation or translation table for converting voltage values into gap amounts, and orientations of nozzle 203N at the teaching positions (the angles of rotation about A-axis and C-axis), etc.

Voltage value acquisition unit 430 acquires from gap sensor 203G a voltage value (analog value) as a result of detection by gap sensor 203G. A/D conversion unit 440 converts the analog voltage value acquired by voltage value acquisition unit 430 into a digital voltage value.

Control unit 410 executes the operating system and various programs stored in storage unit 420. For example, control unit 410 uses the various data stored in storage unit 420 to execute the control program stored in storage unit 420. In the example of FIG. 5, control program execution unit 411 executes the control program, thereby moving machine head 203 to approach start position P4. In the following, operation of each component included in control unit 410 during the approach process will be described based on the example shown in FIG. 5.

Control program execution unit 411 executes the control program for moving machine head 203 from approach start position P4 to position Pu during the approach process. Control program execution unit 411 notifies command signal generation unit 412 of a result of the execution of the control program.

Command signal generation unit 412 generates command signals Jx, Jy, Jz, Jc, Ja, based on the result of the execution. Command signal generation unit 412 sends the generated command signals Jx, Jy, Jz, Jc, Ja to corresponding servo amplifiers 206A, 2068, 206C, 206D, 206E, respectively.

Based on the result of the execution by control program execution unit 411, profile control execution instruction unit 413 determines whether the position of machine head 203 has reached set position Pc. If profile control execution instruction unit 413 determines that the position of machine head 203 has reached set position Pc, profile control execution instruction unit 413 sends a command to profile control execution unit 414 to instruct profile control execution unit 414 to perform the profile control.

Each component included in profile control execution unit 414 executes the following processes for each control cycle, upon receipt of the command.

Gap amount calculation unit 4141 calculates gap amount Dg from the voltage value (digital value) sent from A/D conversion unit 440, using the transformation.

Correction amount calculation unit 4142 calculates distance Ds by subtracting distance Dr from gap amount Dg calculated by gap amount calculation unit 4141. Correction amount calculation unit 4142 calculates gap correction amount Q, based on distance Ds.

Resolve process unit 4143 resolves the gap correction amount Q calculated by correction amount calculation unit 4142 into component Qx in X-axis direction, component Qy in Y-axis direction, and component Qz in Z-axis direction so that the position of machine head 203 is corrected to align with the normal direction of machined area Sr. Resolve process unit 4143 notifies command signal generation unit 412 of components Qx, Qy, Qz each as a correction amount.

Command signal generation unit 412 generates command signals Jx, Jy, Jz, taking into an account the correction amounts (components Qx, Qy, Qz) received from resolve process unit 4143.

The presently disclosed embodiment is illustrative and not limited to only the description set forth above. The scope of the present disclosure is defined by the appended claims, and all changes which come within the meaning and range of equivalency of the appended claims are intended to be included within the scope of the present disclosure.

REFERENCE SIGNS LIST 1 laser machine; 200 machine main body; 201 base member; 203 machine head; 203G gap sensor; 203N nozzle;

206A, 206B, 206C, 206D, 206E servo amplifier; 207A, 207B, 207C, 207D, 207E servomotor; 211, 221, 231 guide member; 212, 222, 232, 242, 252 movable member; 300 table; 400 controller; 401 numerical control device; 402 motor control device; 403 I/O device; 410 control unit; 411 control program execution unit; 412 command signal generation unit; 413 profile control execution instruction unit; 414 profile control execution unit; 420 storage unit; 430 voltage value acquisition unit; 440 conversion unit; 500 oscillator; 4141 gap amount calculation unit; 4142 correction amount calculation unit; 4143 resolve process unit; Df reference gap amount; Dg gap amount; Dh distance; E edge portion; Jx, Jy, Jz command signal; P1 stowed position; P4 approach start position; Pc set position; Pf machining end position; Ps machining start position; R1, R2, R3, R11, R12, R13, R14 route; Sr machined area; W workpiece.

The invention claimed is:

1. A three-dimensional laser machine, comprising:
a machine head having a nozzle, the nozzle through which a laser beam is guided and emitted to a workpiece;
a controller connected to at least one motor, the at least one motor used by the controller to position the machine head and control an orientation of the nozzle; and
a sensor included on the machine head, the sensor detects a distance between the workpiece and the nozzle, the detected distance being provided to the controller, wherein
the controller performs a profile control of correcting a position of the machine head based on the detected distance,
when the machine head reaches a predetermined first position part way through an approach process of moving the machine head from an approach start position to a machining start position while controlling the orientation of the nozzle, the controller performs the profile control and moves the machine head to the machining start position, and
the controller executes a control program for moving the machine head from the approach start position to a predetermined second position along a route connecting the approach start position and the second position, the first position is on the route.

2. The three-dimensional laser machine according to claim 1, wherein
the approach start position is designated by a teaching process.

3. The three-dimensional laser machine according to claim 1, wherein the route connecting the approach start position and the second position in a straight line.

4. The three-dimensional laser machine according to claim 3, wherein
the second position is spaced apart, by a predetermined distance, from a machined area of the workpiece onto which the laser beam is emitted when the machine head is at the machining start position, the predetermined distance being in a normal direction of the machined area.

5. The three-dimensional laser machine according to claim 4, wherein
while the machine head is moving from the first position to the machining start position, the controller corrects the position of the machine head by the profile control so that the position of the machine head aligns with the normal direction of the machined area.

6. The three-dimensional laser machine according to claim 5, wherein
the controller:
positions the machine head by moving the machine head in an X-axis direction, a Y-axis direction orthogonal to the X-axis direction, and a Z-axis direction orthogonal to the X-axis direction and the Y-axis direction;
calculates a correction amount for the position of the machine head by the profile control for each predetermined cycle; and
resolves the correction amount, for each cycle, into a component in the X-axis direction, a component in the Y-axis direction, and a component in the Z-axis direction so that the position of the machine head is corrected to align with the normal direction of the machined area.

7. The three-dimensional laser machine according to claim 5, wherein
the controller:
pre-stores data as the orientation of the nozzle at the machining start position, the data allowing a direction of emission of the laser beam to align with the normal direction of the machined area; and
corrects the position of the machine head based on the data so that the position of the machine head aligns with the normal direction of the machined area.

8. A method for controlling a three-dimensional laser machine, the method comprising:
causing a machine head of the three-dimensional laser machine to approach, via at least one motor, from an approach start position to a machining start position while controlling, via the at least one motor, an orientation of a nozzle of the machine head;
detecting, via a sensor included on the machine head, a distance between the workpiece and the nozzle;
performing, when the machine head has reached a predetermined first position part way through approaching the machining start position, a profile control of correcting a position of the machine head based on the detected distance between the workpiece and the nozzle; and
executing a control program for moving the machine head from the approach start position to a predetermined second position along a route connecting the approach start position and the second position, the first position is on the route.

* * * * *